United States Patent
Lueck et al.

(10) Patent No.: US 8,701,499 B2
(45) Date of Patent: Apr. 22, 2014

(54) METHOD AND APPARATUS FOR THE DETECTION OF DEFECTS IN THE RACEWAYS OF BEARING SHELLS AND IN THE ROLLING ELEMENTS OF CERAMIC HYBRID BEARINGS

(75) Inventors: Rudolf Lueck, Nuthetal (DE); Anika Schoenicke, Hamburg (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 24 days.

(21) Appl. No.: 13/086,463

(22) Filed: Apr. 14, 2011

(65) Prior Publication Data
US 2011/0271765 A1  Nov. 10, 2011

(30) Foreign Application Priority Data
Apr. 23, 2010  (DE) .......................... 10 2010 018 236

(51) Int. Cl.
*G01B 7/16* (2006.01)
(52) U.S. Cl.
USPC .............................................................. 73/779
(58) Field of Classification Search
USPC .............................................................. 73/779
See application file for complete search history.

(56) References Cited

U.S. PATENT DOCUMENTS 7,520,183 B2 * 4/2009 Kouduki et al. ......... 73/862.322
7,882,752 B2 * 2/2011 Ozaki et al. .............. 73/862.322
8,302,492 B2 * 11/2012 Shimizu ................... 73/862.333
2007/0065060 A1 3/2007 Koike et al.
2010/0189384 A1 7/2010 Duppe

FOREIGN PATENT DOCUMENTS

| DE | 112004001197 | 6/2006 |
| DE | 102007043392 | 3/2009 |
| EP | 1550813 | 7/2005 |
| JP | 2004-361259 | 12/2004 |

OTHER PUBLICATIONS

European Search Report dated Aug. 9, 2011 from corresponding foreign application.
German Search Report dated Dec. 29, 2010 from corresponding foreign application.

\* cited by examiner

*Primary Examiner* — Lisa Caputo
*Assistant Examiner* — Octavia Davis-Hollington
(74) *Attorney, Agent, or Firm* — Timothy J. Klima; Shuttleworth & Ingersoll, PLC

(57) ABSTRACT

A method and an apparatus detects defects in raceways of bearing shells and rolling elements of ceramic hybrid bearings. To enable the detection of such defects without falsifying measuring values of the ceramic hybrid bearings installed, the outer or inner ferromagnetic bearing shell of the ceramic hybrid bearing is magnetically coded in at least a partial area and the magnetic coding of the bearing shell is used as generator for testing the raceways of the bearing shells and the ceramic rolling elements by inverse magnetostriction.

8 Claims, 4 Drawing Sheets

Figure 1:
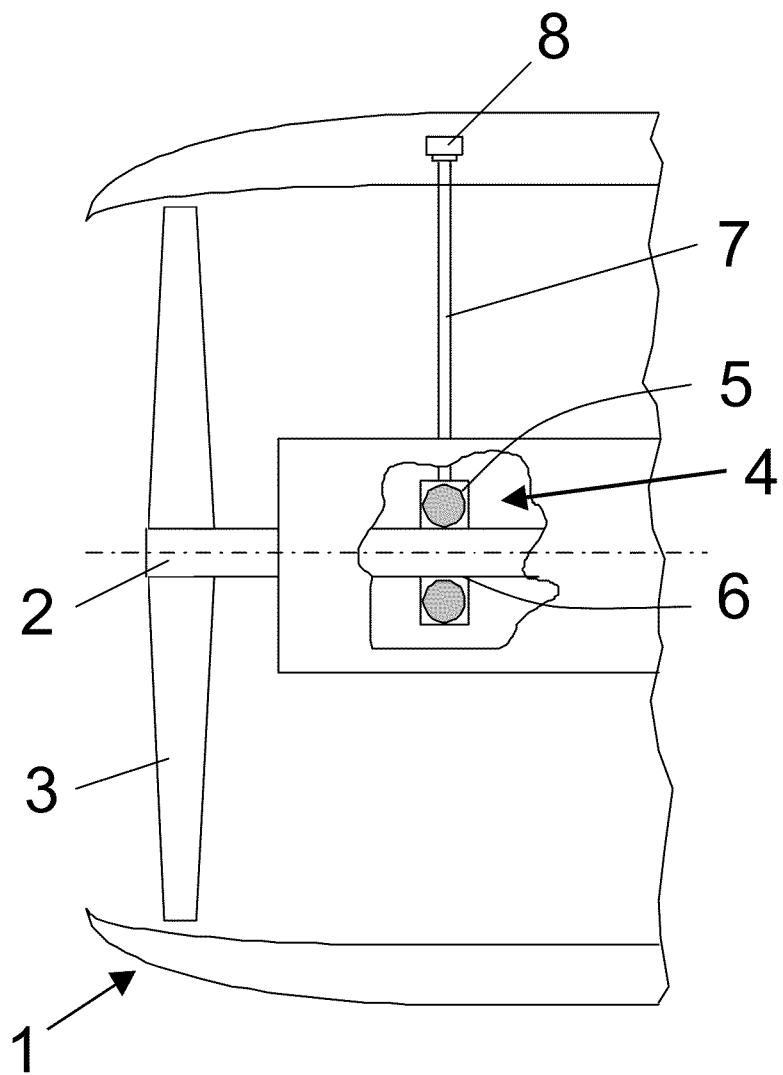

METHOD AND APPARATUS FOR THE DETECTION OF DEFECTS IN THE RACEWAYS OF BEARING SHELLS AND IN THE ROLLING ELEMENTS OF CERAMIC HYBRID BEARINGS

SPECIFICATION

The present invention relates to a method and an apparatus for the detection of defects in the raceways of bearing shells and the ceramic rolling elements of ceramic hybrid bearings.

Ceramic hybrid bearings are bearings whose rolling elements, in particular balls, are made of ceramic material and whose bearing shells, i.e. the inner and outer ring, are made of metallic materials, in particular steel. The ceramic hybrid bearings have advantages over conventional bearings with rolling elements made of metallic materials, for example lower density at higher modulus of elasticity of the ceramic rolling elements. Since the wear characteristics of this type of bearings are still largely unknown, it is particular important that beginning damage is here detected as early as possible.

In the case of ceramic hybrid bearings installed in an aircraft engine, it is generally known to transmit the vibrations of the installed bearing via a rigid strut to a vibration sensor firmly installed in the casing, receive them by the sensor and evaluate them in an electronic evaluator. Due to the rigid strut, dampening and falsification of the higher frequencies from the ceramic hybrid bearing to the vibration sensor or probe is however to be expected.

From Specification US 2005/0066741 A1, a method for fracture testing of ceramic bearing balls is known. Here, a method for determining the fracture toughness of ceramic balls is employed. For this purpose, a single ceramic ball is located and mechanically loaded in a mechanical testing apparatus. Any possible crack propagation is measured and evaluated via an optical system.

From Specification U.S. Pat. No. 7,370,537 B2, a method for acoustic testing of individual ceramic balls is known. Here, the ceramic ball is mechanically loaded in a testing apparatus corresponding to the above testing apparatus. Non-conformances in the ceramic ball can be determined on the basis of the known fracture toughness of the ceramic material using a microphone.

Both known methods are disadvantageous in that the strength of the ceramic balls can only be tested prior to their installation in a ceramic hybrid bearing. Continuous testing of the ceramic balls installed in a ceramic hybrid bearing as well as their bearing shells in operation is not possible.

in a broad aspect, the present invention provides a method and an apparatus for the detection of defects of the ceramic rolling elements installed in a ceramic hybrid bearing, in particular ceramic balls, and their bearing shells without falsification of the measuring values of the installed ceramic hybrid bearings occurring.

It is a particular object of the present invention to provide that the outer, ferromagnetic bearing shell of the ceramic hybrid bearing is magnetically coded in at least a partial area and the magnetic coding of the bearing shell is used as generator for testing the bearing shells and their ceramic rolling elements by means of inverse magnetostriction. The detection of defects and the safety against these defects in the bearing shells and their ceramic rolling elements is thus considerably improved in the application of the installed ceramic hybrid bearings.

The present invention enables defects in the raceways of the bearing shells and the ceramic rolling elements rotating therein to be continuously inspected during the operation of the ceramic hybrid bearings. For this purpose, the outer ring, or also the inner ring of the bearing must be made of a ferromagnetic material, such as iron, nickel, cobalt and their alloys. The characteristics of the pressure exerted by the ceramic rolling elements in the form of balls, rollers etc. on the bearing surfaces of the bearing shells are measured over part of the circumference of the bearing shell or over the entire circumference of the bearing shell by means of the method of inverse magnetostriction. The pressure characteristics are regularly inspected on the installed ceramic hybrid bearing at certain time intervals or continuously during the operation of the bearing. The pressure signature of the bearing under inspection is compared with known pressure signatures of damaged and non-damaged bearings.

If preferably only individual rolling elements are monitored or inspected for pressure characteristics, the length of the sensitive, measured partial area must correspond to the circumference of one rolling element or, respectively, one ceramic ball of the ceramic hybrid bearing so as to cover, as selectively as possible, one, or at most two, rolling elements at one time. A further option is to measure or inspect, by way of inverse magnetostriction, the entire raceway or, respectively, the entire circumference of the bearing inner or outer ring with regard to the pressure characteristics.

The pressure of the ceramic rolling element, in particular the ceramic ball, on a partial area of the raceway of the ferromagnetic bearing shell leads to a change in the preferred direction of the magnetic flux in the bearing shell due to the inverse magnetostrictive effect. The change in the preferred direction of the magnetic flux in the bearing shell also leads to a change of the magnetic field outside of the bearing shell which can be measured by various known methods for the measurement of magnetic fields.

In order to enable the change in the preferred direction of the magnetic flux to be measured, a magnetic field is to be provided which causes a magnetic flux in the bearing shell. One possibility is to provide magnetic structures directly in the bearing shell (magnetization). Another possibility is to use an external magnetic field and lead the magnetic flux through the bearing shell area to be measured. In order to compensate for disturbances by external magnetic fields, it is advantageous for magnetization provided in the bearing shells as well as externally applied magnetic fields to use two or more, spatially separated, oppositely directed magnetic fields. The fields resulting in the bearing from the pressure characteristics on the bearing shell are measured and the final pressure characteristics are then established by forming the difference of both fields. By forming this difference, externally introduced magnetic disturbances are largely eliminated.

The pressure exerted on the bearing shells changes the orientation of the Weiss' domains in the bearing shells. This results in a change of the preferred direction of magnetization in the ferromagnetic material leading also to a measurable spatial change of the field outside of the bearing shells.

Depending on the size of the magnetic fields to be measured, Hall-effect probes and field plates (0.5 µT-5 T), magnetoresistive sensors (0.5 µt-5 mT), flux gate sensors (10 pT-100 µT) or SQUID's (1 fT-10 nT) are used.

It is assumed here that flux gates have appropriate sensitivity as well as the necessary robustness of the measuring elements. The spatial distribution of the magnetic field can be determined using three orthogonally directed sensors. Tri-axial flux gate sensors are commercially available as unit, e.g. Stefan Meyer Instruments FLC3-70.

Should critical damage now occur in the ceramic rolling elements or the raceways of the bearing shells, the spatial and temporal pressure characteristics of the bearing shell to be measured will change. In consequence thereof, the magnetic flux characteristics in the bearing shell will change, leading to a change of the spatial orientation of the field strength of the magnetic field also outside of the bearing shell. Thus, a comparison of the signature of the magnetic field strengths before and after an event can provide information on potential defects in the ceramic rolling elements or, respectively, the ceramic balls or the raceways of the bearing shells.

If the entire circumferential area of the outer or inner bearing shell is designed as measuring element, the present method allows damage to be detected also on the entire circumferential areas of the bearing rings or the bearing shells, respectively.

The present invention further relates to an apparatus for the detection of defects on the raceways of bearing shells and in the rolling elements of ceramic hybrid bearings according to the method of the present invention.

The present invention finally relates to the application of inverse magnetostriction for determining the pressure characteristics in bearing shells and ceramic rolling elements of a ceramic hybrid bearing used for bearing the main drive shaft of an aircraft engine.

The present invention provides for continuous, non-contact inspection of the ceramic rolling elements and the bearing rings. Defective ceramic rolling elements or balls or the bearing rings thereof can thus be readily detected.

Figure 3:
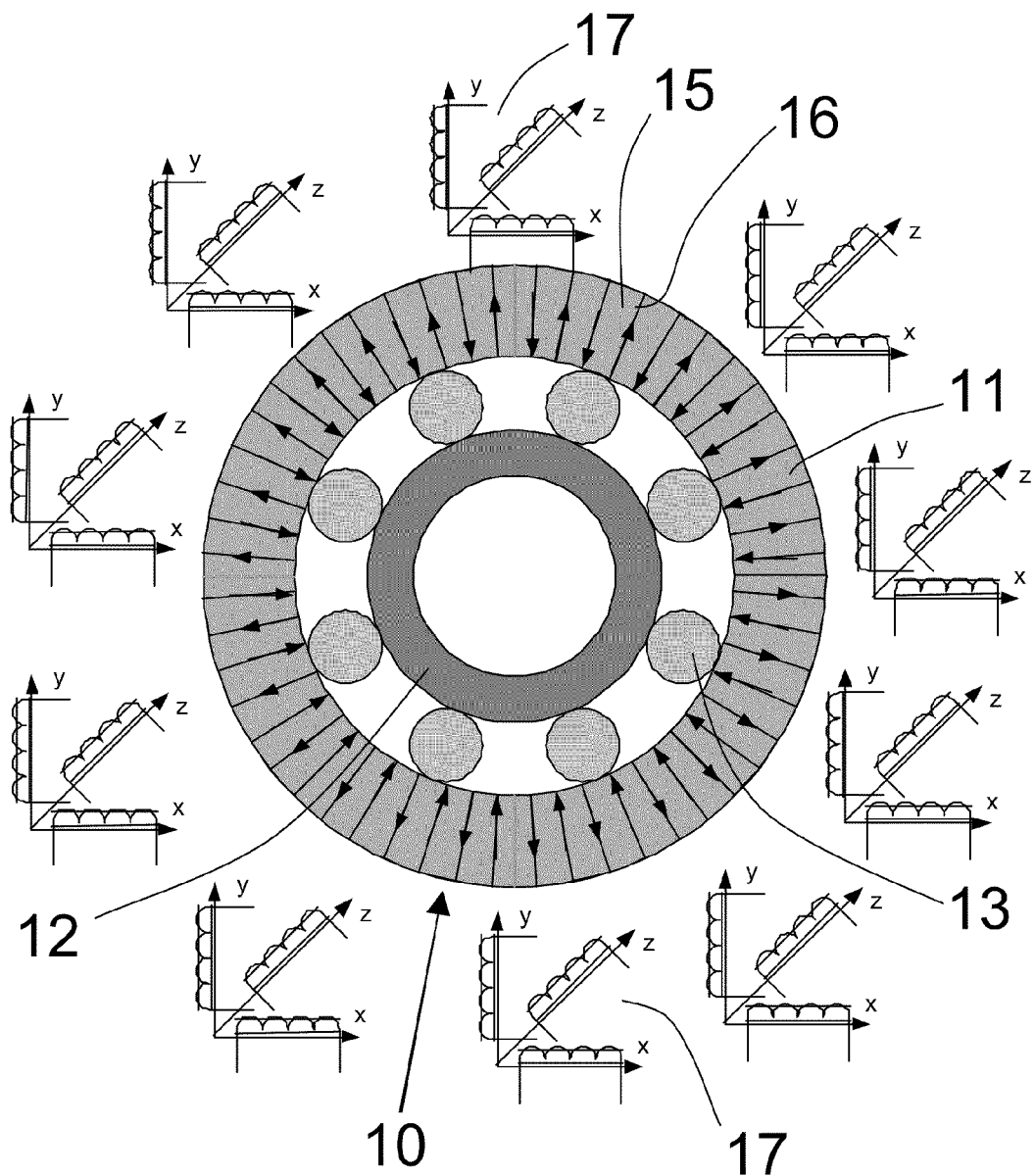
Figure 4:
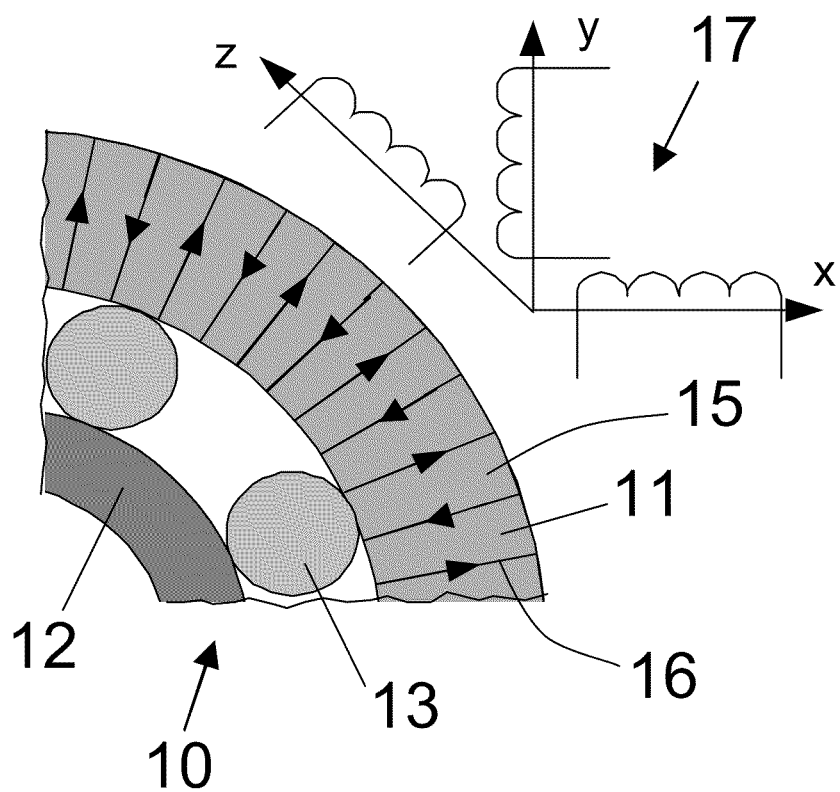

The present invention is more fully described in light of two different methods for the detection of defects in the raceways of bearing shells and in the ceramic rolling elements or balls, respectively, of ceramic hybrid bearings. In the drawings, FIG. 1 is a schematic longitudinal sectional view through an aircraft engine with a defect detection apparatus for a rolling-contact bearing according to the state of the art, FIG. 2 is a view of a ceramic hybrid bearing when testing only a partial area of the circumference of the outer bearing shell, FIG. 3 is a view of a ceramic hybrid bearing when testing the entire circumference of the outer bearing shell, and FIG. 4 shows the special arrangement of the measuring sensors beside the ceramic hybrid bearing.

FIG. 1 shows, in schematic longitudinal view through an aircraft engine, a defect detection apparatus according to the state of the art. Shown here is the main drive shaft 2 borne in the engine casing 1, with a fan 3 borne on the shaft 2 and with a rolling-contact bearing 4 with inner ring 6 and outer ring 5 arranged on the shaft 2. The outer ring 5 is connected via a rigid strut 7 to a vibration sensor 8 which is arranged in the engine casing 1 and can receive the vibrations of the rolling-contact bearing 4. Due to the rigid strut 7 being used as transmission element, there is the danger of dampening and falsification of higher frequencies from the bearing 4 to the vibration sensor 8.

Figure 2:
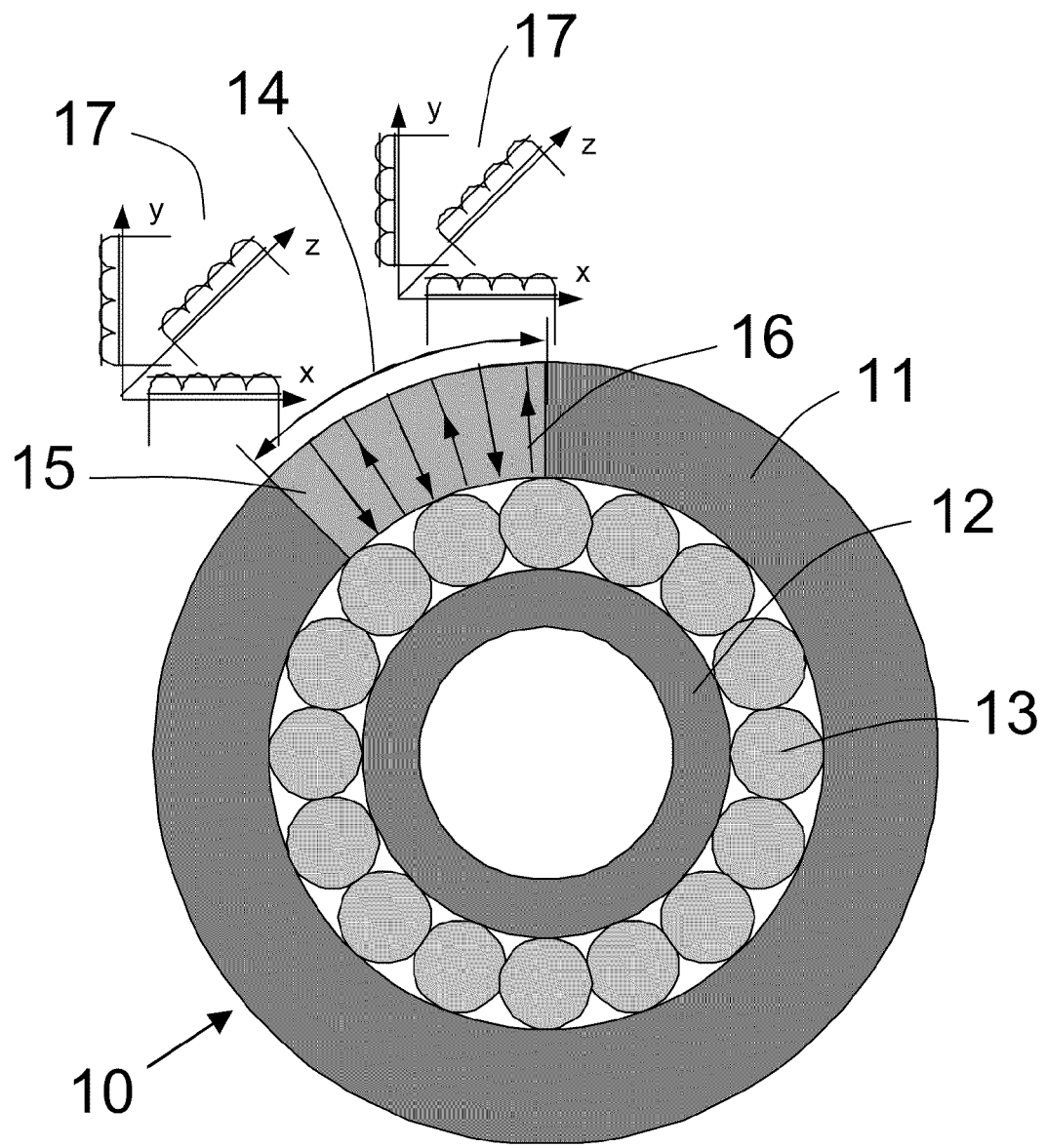

The ceramic hybrid bearing 10 according to the present invention shown in the view of FIG. 2 includes a stationary outer ring 11, an inner ring 12 co-rotating with the shaft 2 and interposed ceramic rolling elements in the form of ceramic balls 13. The outer ring 11 and the inner ring 12 form the bearing shells of the ceramic hybrid bearing 10 and are made of ferromagnetic material, in particular iron, nickel, cobalt and their alloys. The ceramic material of the ceramic balls 13 is both non-magnetic and electrically non-conductive. The ceramic hybrid bearing 10 is used, among others, on aircraft engines.

A partial area 14 of the outer ring 11 made of ferromagnetic material is provided with oppositely directed magnetic structures 15 preferably prior to the installation of the bearing 10, for example in an aircraft engine. In the process, magnetic structures are provided in the area 14 in which all elementary magnets have the same, but alternately opposite orientation, as indicated in FIG. 2 by the arrowheads 16.

Arranged on the outside of the stationary, non-rotating outer ring 11 are sensors 17 which are connected to an electronic evaluator not further shown. The sensors 17 measure the magnetic field H outside of the outer ring 11. The sensors 17 are arranged around the outer ring (in the x, y and z-axis direction), as shown in FIGS. 2, 3 and 4. The number and arrangement of the sensors 17 must agree with the orientation of the individual magnetization of the magnetic structures 15 so as to attain a clearly measurable change in the measured magnetic field H outside of the outer ring 11 when there is a change in the pressure of the ceramic balls 13 on the raceway of the outer ring 11.

If magnetic fields H are introduced from the outside into the outer ring 11 of bearing 10 to enable the change in the preferred direction of magnetization to be measured, then this is accomplished analogically to the magnetic structures 15 provided in the outer ring 11.

The partial area 14 of the circumference of the outer ring 11 is measured by inverse magnetostriction to determine the pressure characteristics between the ceramic balls 13 and the outer ring 11. If only one ceramic ball 13 is to be inspected, the length of the sensitive, measured partial area 14 corresponds to the circumference of one ceramic ball 13. The pressure of the ceramic ball 13 on the partial area 14 of the raceway of the outer ring 11 made of ferromagnetic material, due to the inverse magnetostrictive effect, leads to a change in the magnetic flux in the outer ring 11 of the ceramic hybrid bearing 10 which can be measured by various known methods for the measurement of magnetic fields. Inverse magnetostriction leads to a change in the preferred direction of magnetization by mechanical stress, here caused by the ceramic balls 13 rolling on the raceways of the outer ring 11. Here, magnetic field-measuring sensors 17 are used. The inverse magnetostrictive effect is used for measuring the pressure force.

In the event of critical damage developing in the ceramic balls 13, the temporal or spatial pressure characteristics on the measured outer ring 11 or, respectively, the measured inner ring 12 of the ceramic hybrid bearing 10, will change, with the magnetic flux also changing its characteristics.

Accordingly, a comparison of the magnetic fluxes prior to and after an event provides information on possible defects in the measured ceramic ball 13 or the bearing shells (outer or inner ring 11, 12, respectively).

The ceramic hybrid bearing 10 shown in the view of FIG. 3 corresponds in its design to the ceramic hybrid bearing 10 as per FIG. 2. Here, other than in the method for the detection of defects on individual ceramic balls 13 according to FIG. 2, the entire ring circumference of the outer ring 11 is measured by inverse magnetostriction to inspect the pressure characteristics of all ceramic balls 13. For this purpose, several, in the example ten, sensors 17 measuring the magnetic field H outside of the outer ring 11 are distributed over the circumference. The number and arrangement of the sensors 17 must agree with the magnetization provided, here the magnetic structures 15 provided in accordance with the arrowsheads 16 on the entire circumference of the outer ring 11, to attain, in the event of a pressure change, a clearly measurable change in the measured magnetic field H outside of the outer ring 11.

The sensors 17 and the magnetization can also be applied to the inner ring 12 of the ceramic hybrid bearing 10. It should be taken into account, however, that the measurement should not be made on the rotating bearing shell (inner or outer ring 11, 12, respectively) of the bearing 10, but only on the stationary inner or outer ring 11, 12, respectively.

As already described in the above with reference to FIG. 3, inspection for defects is accomplished on all ceramic balls 13 of the ceramic hybrid bearing 10. If the entire circumference of the outer ring 11 of the ceramic hybrid bearing 10 is designed as measuring element, damage is detectable also on the entire outer ring 11 or the entire raceway of the bearing shell, respectively.

Both types of the method provide for continuous inspection of the respective stationary bearing shell of the outer or inner ring 11, 12, respectively, and the ceramic balls 13, taking into account that preferably only the stationary bearing shell is used for the performance of the method. Thus, defective ceramic balls 13 and bearing shells of the outer or inner ring 11, 12 are readily detectable in operation.

FIG. 4 shows a sensor 17 of a bearing ring (outer ring 11) with oppositely directed magnetic structures 15 in an arrangement beside the ceramic hybrid bearing 10. The orientation of all sensors 17 beside the outer bearing ring 11 relative to the internal magnetic structure 15 is harmonized such that in the event of a change in the pressure characteristics the best possible signal change is attainable by a rolling element in the form of a ceramic ball 13 rolling over a sensor 17 via the change in the preferred direction of magnetization due to inverse magnetostriction.

List of Reference Numerals
1 Engine casing
2 Shaft
3 Fan
4 Rolling-contact bearing
5 Outer ring
6 Inner ring
7 Strut
8 Vibration sensor
9 - - -
10 Ceramic hybrid bearing
11 Outer ring
12 Inner ring
13 Ceramic ball
14 Partial area
15 Magnetic structure
16 Arrowhead
17 Sensor

What is claimed is:

1. A method for detecting defects in at least one chosen from raceways of bearing shells and rolling elements of ceramic hybrid bearings, comprising:
   magnetically coding at least one chosen from an outer and an inner ferromagnetic bearing shell of a ceramic hybrid bearing in at least a partial area to form at least two spatially separated oppositely directed magnetic fields in the bearing shell;
   using the magnetic coding of the bearing shell for generating changes in at least one magnetic field via inverse magnetostriction, for testing the raceways of the bearing shells and the ceramic rolling elements;
   providing at least two spatially separated sensors arranged around a circumference of the bearing shell for sensing the at least two spatially separated oppositely directed magnetic fields, a number and arrangement of the at least two spatially separated sensors corresponding to an orientation of the at least two spatially separated oppositely directed magnetic fields; and
   establishing final pressure characteristics by forming a difference of the at least two spatially separated oppositely directed magnetic fields sensed by the at least two spatially separated sensors, thereby reducing an effect on the inverse magnetostriction of the bearing shell by a magnetic field externally introduced on the ceramic hybrid bearing.

2. The method in accordance with claim 1, and further comprising magnetically coding at least one chosen from an entire raceway and an entire circumference of the bearing shell.

3. The method in accordance with claim 2, and further comprising using an electronic evaluator for at least one chosen from measuring and evaluating the at least two spatially separated oppositely directed magnetic fields.

4. The method in accordance with claim 2, and further comprising determining pressure characteristics in at least one chosen from a bearing shell and ceramic rolling elements of a ceramic hybrid bearing used for bearing a main drive shaft of an aircraft engine.

5. The method in accordance with Claim 1, comprising using an electronic evaluator for at least one chosen from measuring and evaluating the at least two spatially separated oppositely directed magnetic fields.

6. The method in accordance with claim 1 comprising using an electronic evaluator for at least one chosen from measuring and evaluating the at least two spatially separated oppositely directed magnetic fields.

7. The method in accordance with claim 1, and further comprising using an electronic evaluator for at least one chosen from measuring and evaluating the at least two spatially separated oppositely directed magnetic fields.

8. The method in accordance with claim 1, and further comprising determining pressure characteristics in at least one chosen from a bearing shell and ceramic rolling elements of a ceramic hybrid bearing used for bearing a main drive shaft of an aircraft engine.

\* \* \* \* \*